United States Patent
Mizuno et al.

(10) Patent No.: US 6,679,666 B2
(45) Date of Patent: Jan. 20, 2004

(54) SCREW HAVING A TEMPORARY HOLDING MEMBER ON THE SCREW SHANK

(75) Inventors: Hiromichi Mizuno, Aichi (JP); Katsuhisa Kato, Aichi (JP); Muneyuki Onogi, Aichi (JP); Hiroyasu Ichikawa, Aichi (JP)

(73) Assignee: Aoyama Seisakusho Co., Ltd., Nagoya (JP)

( * ) Notice: Subject to any disclaimer, the term of this patent is extended or adjusted under 35 U.S.C. 154(b) by 0 days.

(21) Appl. No.: 10/006,521

(22) Filed: Dec. 3, 2001

(65) Prior Publication Data
US 2002/0071739 A1 Jun. 13, 2002

(30) Foreign Application Priority Data
Dec. 7, 2000 (JP) ........................................ 2000-372733

(51) Int. Cl.$^7$ ................................................. F16B 21/18
(52) U.S. Cl. ........................ 411/353; 411/999; 411/970
(58) Field of Search .............................. 411/999, 970, 411/969, 353, 427, 435, 366.1

(56) References Cited

U.S. PATENT DOCUMENTS

| | | | |
|---|---|---|---|
| 2,709,470 A | * | 5/1955 | Knohl |
| 2,761,484 A | * | 9/1956 | Sternick |
| 3,086,421 A | | 4/1963 | Hamman |
| 3,262,352 A | | 7/1966 | Bedford, Jr. |
| 3,579,942 A | * | 5/1971 | Cole |
| 3,606,357 A | | 9/1971 | Yonkers |
| 3,917,300 A | * | 11/1975 | Salomon |
| 4,191,389 A | | 3/1980 | Jelinek |
| 4,448,565 A | * | 5/1984 | Peterson |
| 4,810,144 A | * | 3/1989 | Martelli |
| 5,396,194 A | * | 3/1995 | Johnson |
| 6,018,828 A | * | 2/2000 | Loschelder |
| 6,379,093 B1 | * | 4/2002 | Bondarowicz |

FOREIGN PATENT DOCUMENTS

| | | |
|---|---|---|
| EP | 0 271 648 A | 6/1988 |
| JP | 5365/1996 | 2/1996 |

* cited by examiner

*Primary Examiner*—Flemming Saether
(74) *Attorney, Agent, or Firm*—Frishauf, Holtz, Goodman & Chick, P.C.

(57) ABSTRACT

A screw capable of simplifying an assembly work and shortening a release hole for causing the screw to abut thereagainst and of clamping a part being clamped with a high sealing property. The screw comprises a temporary holding member 12 provided on a screw shank 1 for temporarily holding the screw on a part being clamped, and the temporary holding member 12 is a molding of plastics formed on an intermediate, outer periphery of the screw shank 1 and comprises elastic blade pieces extending radially and provided on an outer periphery of a short cylinder portion having a female thread portion matching a male thread 8 of the screw shank 1.

4 Claims, 9 Drawing Sheets

PRIOR ART

PRIOR ART

SCREW HAVING A TEMPORARY HOLDING MEMBER ON THE SCREW SHANK

BACKGROUND OF THE INVENTION

The invention relates to a screw capable of temporarily holding a screw such as bolts, screws or the like without falling off a part being clamped, and clamping a part being clamped with an excellent sealing property.

Conventionally, in the case of mounting a screw, such as bolts, screws or the like, on a part being clamped and temporarily holding the same thereon without falling-off, mounting of the screw is performed by, for example, first inserting a screw shank 1 of the screw through a screw insertion hole 3 provided on the part being clamped 2 such as an automobile's interior equipment, brackets or the like, as shown in FIG. 8 and then fitting a washer 4 of synthetic resin onto a cylindrical-shaped portion 5 below a neck of the screw by manual work. However, fitting of the washer 4 with manual work requires a large amount of manhours which increases the cost of assembly.

Also, when a screw temporarily held on a part being clamped 2 is to be clamped to a mount member 6 such as a cover or the like as shown in FIG. 9, the part being clamped 2 is first set in a desired location on the mount member 6 and the screw is threaded by rotating a bold after the screw is made to abut against a location of use, that is, an inlet of a female thread portion 7 of the mount member 6. However, since the washer 4 is mounted on a cylindrical-shaped portion 5 above a male thread 8 on a screw shank 1, a release hole 9 having a length corresponding to the length of the male thread 8 plus the length of the washer 4 is needed to be provided above the female thread portion 7, with the result that it is necessary to correspondingly make the cover thick, which will make the cover thick and heavy.

Further, there is a prior art, in which a falling-off preventive member 19 of a resin is fixed to a tip end of a screw 1, as shown in FIG. 10A. However, since such fixed falling-off preventive member 19 can not move along the male thread 8 of the screw 1 during the clamping, it had serious shortages. When the diameter of the prepared hole in the part being clamped is going larger, the length of the elastic blade portion 14 become longer and thereby the length of the falling-Off preventing member 19 also become longer, as shown in FIG. 10B.

Japanese Utility Model Publication No. 5365/1996 has been published on a prior application filed by the applicant of this application, and discloses the provision of an annular recess for causing a temporary holding member to be embedded between a threaded portion and a neck portion of a screw. However, such temporary holding member is an insert molding, which is free of rotation about a screw shank of the screw, and so neither teaches nor suggest the invention of this application.

Also, in the case where a prior art screw is used to perform bolt-clamping of a part being clamped 2 to a mount member, a screw seat surface 11, with which a back surface of a screw head 10 comes into contact, is not fully sealed, so that moisture content such as rain water or the like sometimes permeates clamped portions to generate corrosion such as rust. To cope with this, there is the need of mounting a rubber washer on the screw seat surface 11 to improve the sealing property, thus causing a problem that the number of parts increases and the assembly work becomes troublesome.

The invention has been thought of to solve the above-mentioned prior problem and to provide a screw capable of simplifying an assembly work and shortening a release hole for causing the screw to abut thereagainst and of clamping a part being clamped with a high sealing property.

SUMMARY OF THE INVENTION

To solve the above-mentioned problem, a screw according to the invention comprises a temporary holding member provided on a screw shank for temporarily holding the screw on a part being clamped, the temporary holding member being a molding of plastics formed on an intermediate, outer periphery of the screw shank and comprising elastic blade pieces extending radially and provided on an outer periphery of a short cylinder portion having a female thread portion matching a male thread of the screw shank 1.

Elastic blade pieces of a temporary holding member provided on a screw of the invention extend radially on an outer periphery of a short cylinder portion and are provided on an intermediate, outer periphery of the screw shank. A largest portion of the entire elastic blade pieces has a slightly larger diameter than an inner diameter of a screw insertion hole provided in a part being clamped. The elastic blade pieces can be press fitted into the screw insertion hole due to their elasticity, but it will not return back from the screw insertion hole when once inserted, and so the screw is free from naturally falling off the part being clamped. Also, the temporary holding member is provided in a location at an intermediate portion of the screw shank and as downward as possible, whereby the length of the release hole can be significantly shortened and so a mount member such as a cover or the like can be made small in thickness and lightweight.

Also, when the screw of the invention is used to integrally clamp a part being clamped to a mount member, the temporary holding member is collapsed and deformed, and a part of plastics, which constitutes the temporary holding member, fills into an air gap between the screw shank and the part being clamped and the mount member and bites into interfaces between the male thread and the female thread portion, so that sealing is made more complete, as compared with the prior art, and clamping of the part being clamped can be made.

DISCLOSURE OF THE PREFERRED EMBODIMENT OF THE INVENTION

Figure 1:
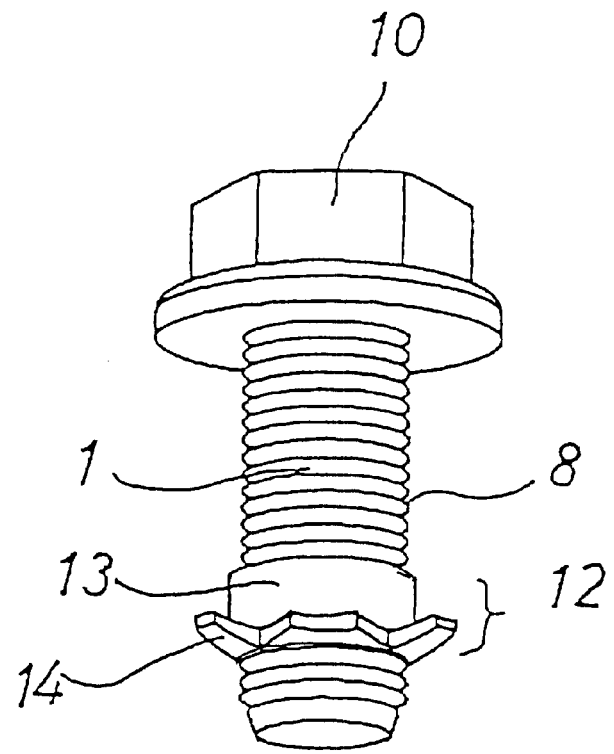
FIG. 1 is a perspective view showing a screw according to the invention.
Figure 2A:
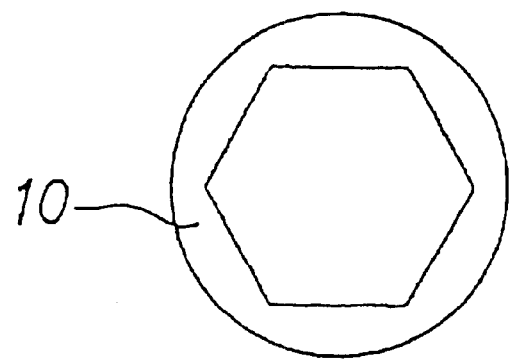
FIG. 2A is a plan view and FIG. 2B is a front view showing the screw according to the invention.
Figure 2B:
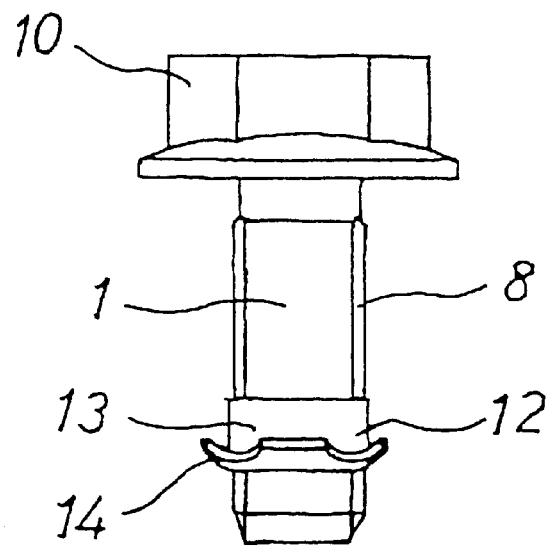

Preferred embodiments of the invention will be illustrated below with reference to the drawings. FIGS. 1 and 2 are views showing a screw according to the invention, and the reference numeral 12 denotes a temporary holding member provided on an intermediate, outer periphery of a screw shank 1 by means of insert molding, fusion, crimping or the like, the temporary holding member 12 comprising a plurality of elastic blade pieces 14 extending somewhat upwardly and radially on an outer periphery of a lower end of a short cylinder portion 13. The elastic blade pieces 14 are desirably provided on the lower end of the short cylinder portion 13 because a recess of thread portion can be made short.

In addition, the screw in the embodiment shown in the drawings comprises a screw head 10, which is hexagonal in shape and flanged, but it may be in the form of, for example, a plus screw or a screw of torque wrench type. The shape of a tip end of the screw may be, for example, the one having a taper.

Figure 3:
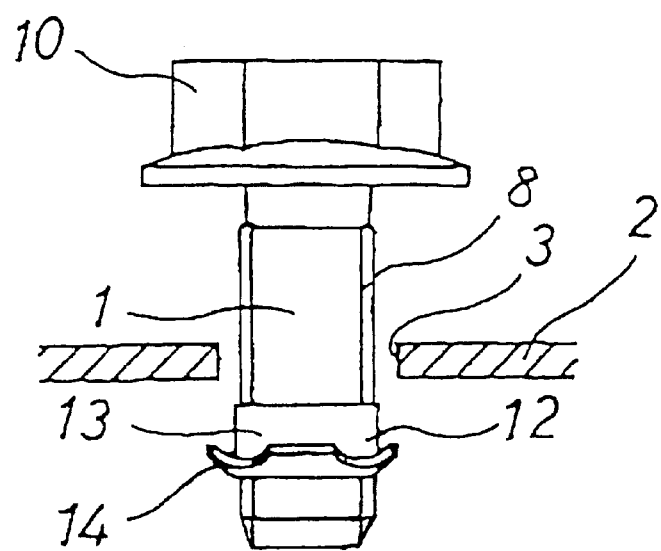
FIG. 3 is a front view showing a state, in which the screw is inserted into a part being clamped.

Such screw can be simply set on a screw insertion hole 3 of a part being clamped 2, without falling off, by inserting the screw shank 1 through the screw insertion hole 3 as shown in FIG. 3 while flexing the elastic blade pieces 14. In addition, the temporary holding member 12 is desirably formed from a thermoplastic elastomer such as polyester-based one, polyolefin-based one or the like, which has an adequate elasticity because the elastic blade pieces 14 can be inserted while deformed upon press fitting and are prevented from naturally falling off. Furthermore, it is able to use a soft material such as aluminium, other than the resins.

Figure 4:
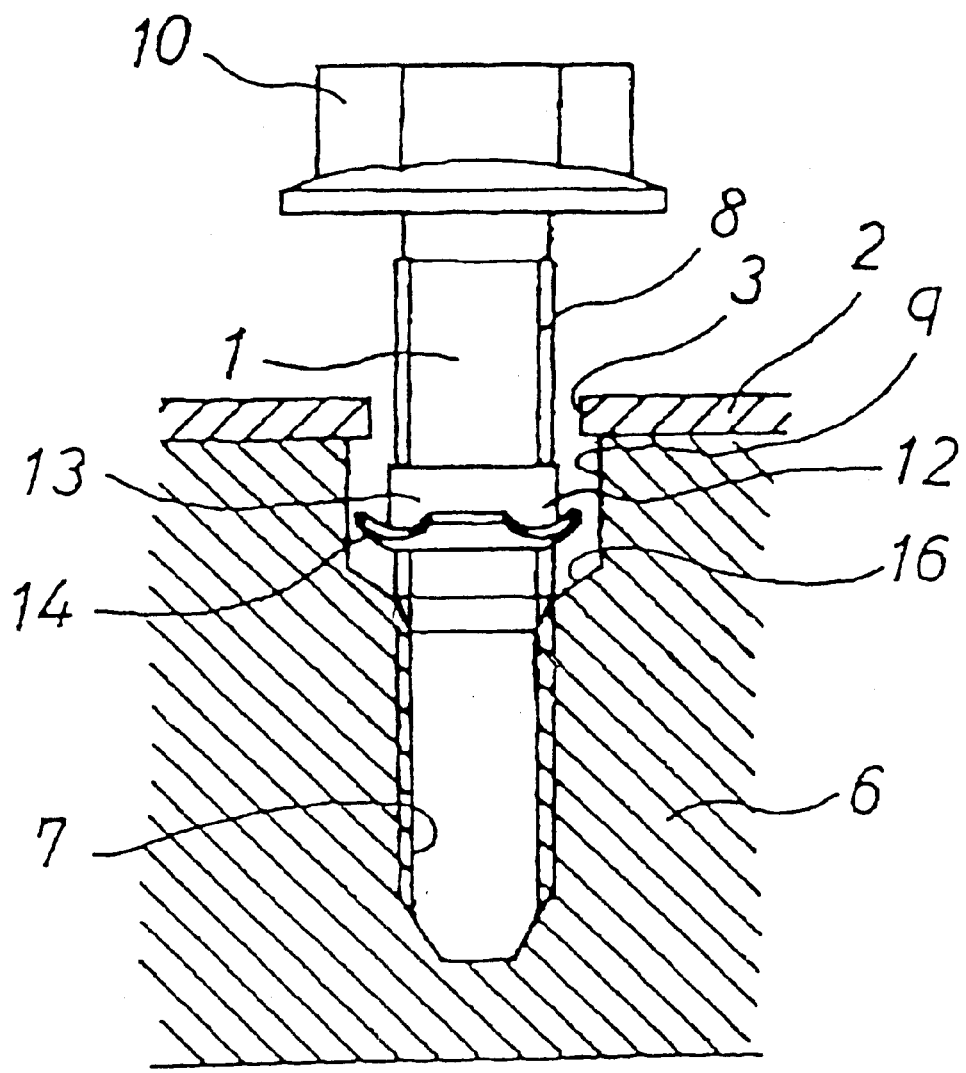
FIG. 4 is a front view showing a state, in which the part being clamped is set in a desired location on a mount member.

And when the part being clamped 2 is to be clamped to a mount member 6 with the screw, the part being clamped 2 is first set in a desired position on a mount member 6 as shown in FIG. 4, which setting causes a lower end of the male thread 8 to abut against an inlet of the female thread portion 7. Here, since the temporary holding member 12 is provided near the lower end of the male thread 8 and the elastic blade pieces 14 are on the outer periphery of the lower end of the short cylinder portion 13, a release hole 9 can be made considerably shorter than that in the case where a washer is mounted. Further, in the case where the temporary holding member 12 is provided such that the elastic blade pieces 14 are located at the lower end of the male thread 8, back surfaces of the elastic blade pieces 14 are caused to abut against a bottom surface 16 of the release hole 9, when the part being clamped 2 is set in a desired position on the mount member 6, to enable significantly shortening the length of the release hole 9 to several mm as long as the length of the short cylinder portion 13.

Figure 5:
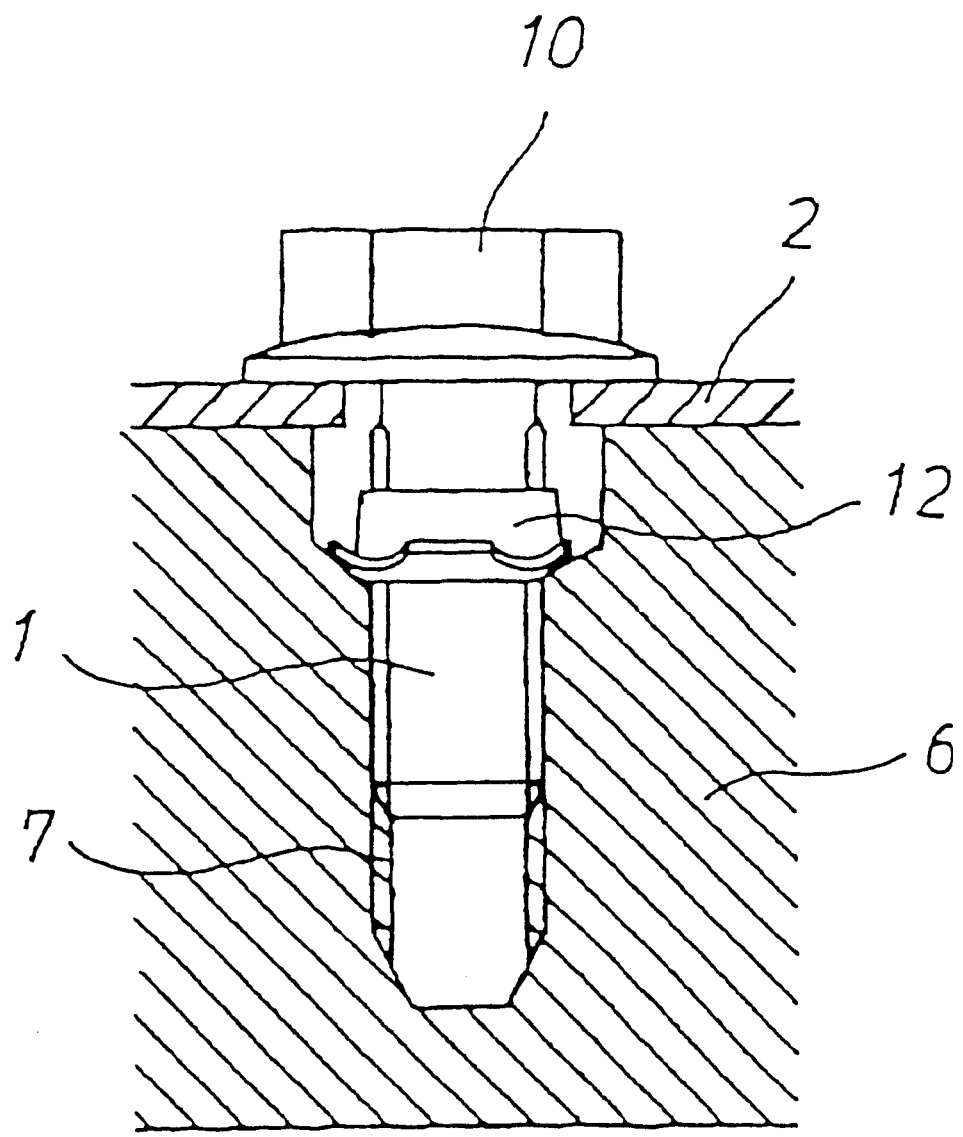
FIG. 5 is a front view showing a state, in which clamping of the screw of FIG. 4 is completed.

The screw temporarily held on the part being clamped 2 in the above manner can perform automatic fastening with a machine, on which a work tool is set, and so the part being clamped 2 can be integrally clamped on the mount member 6 as shown in FIG. 5. In addition, since the temporary holding member 12 is formed on the male thread 8 as by insert molding, a female thread portion (not shown) matching the male thread 8 is formed inside of the short cylinder portion 13. Accordingly, the short cylinder portion 13 is closely secured to the male thread 8 immediately after the insert molding. Since rotation accompanying clamping of the screw causes the temporary holding member 12 to be subjected to frictional resistance by the bottom surface 16 of the release hole 9, the temporary holding member 12 rotates about the outer periphery of the male thread 8 to be moved toward the screw head 10, so that the part being clamped 2 is clamped to the mount member 6.

In addition, a lubricant such as wax or the like may be exemplarily coated on surfaces of the screw shank 1 so as to smoothen rotation of the temporary holding member 12 about the outer periphery of the male thread 8.

Figure 6:
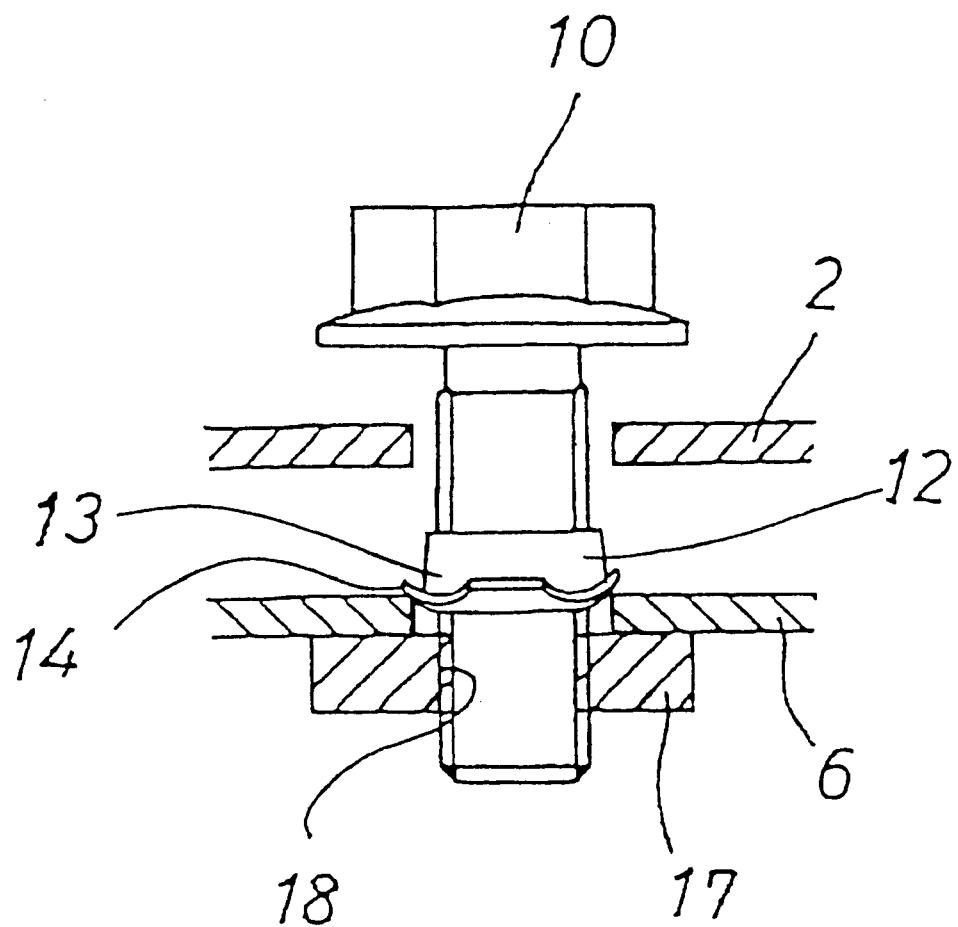
FIG. 6 is a front view showing a state, in which the screw is being threaded into a weld nut.
Figure 7:
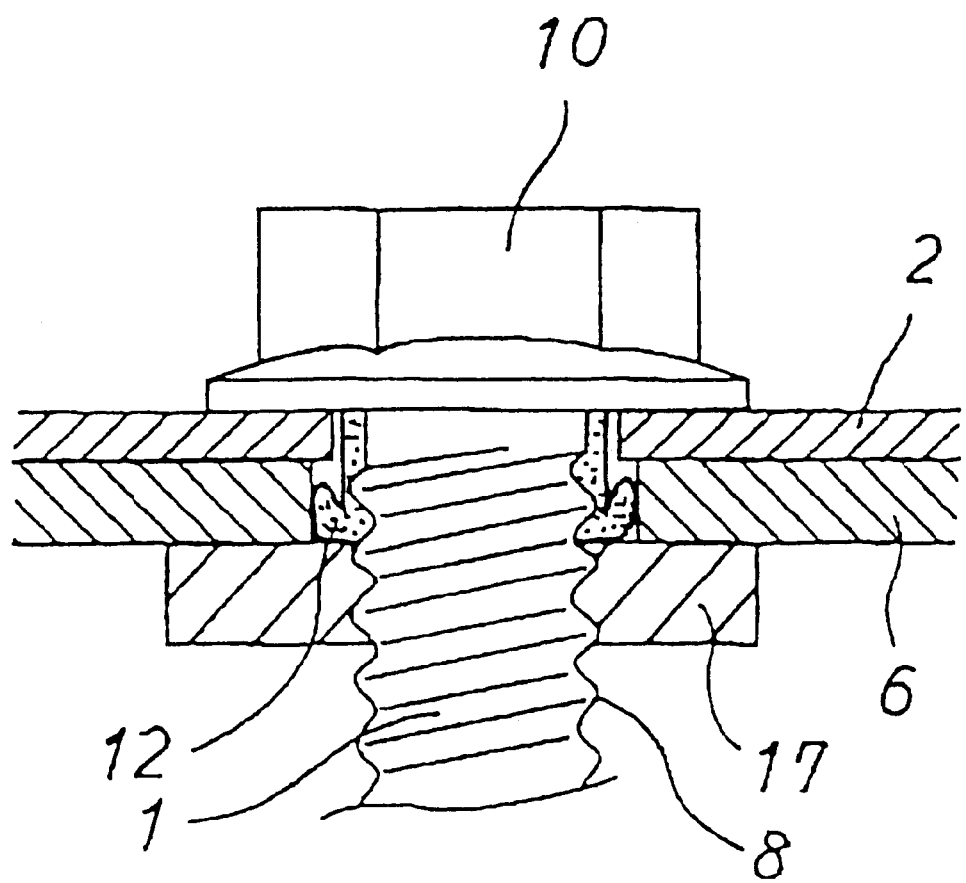
FIG. 7 is an enlarged, front view showing the vicinity of a screw head in a state, in which clamping of the screw of FIG. 6 is completed.
Figure 8A:
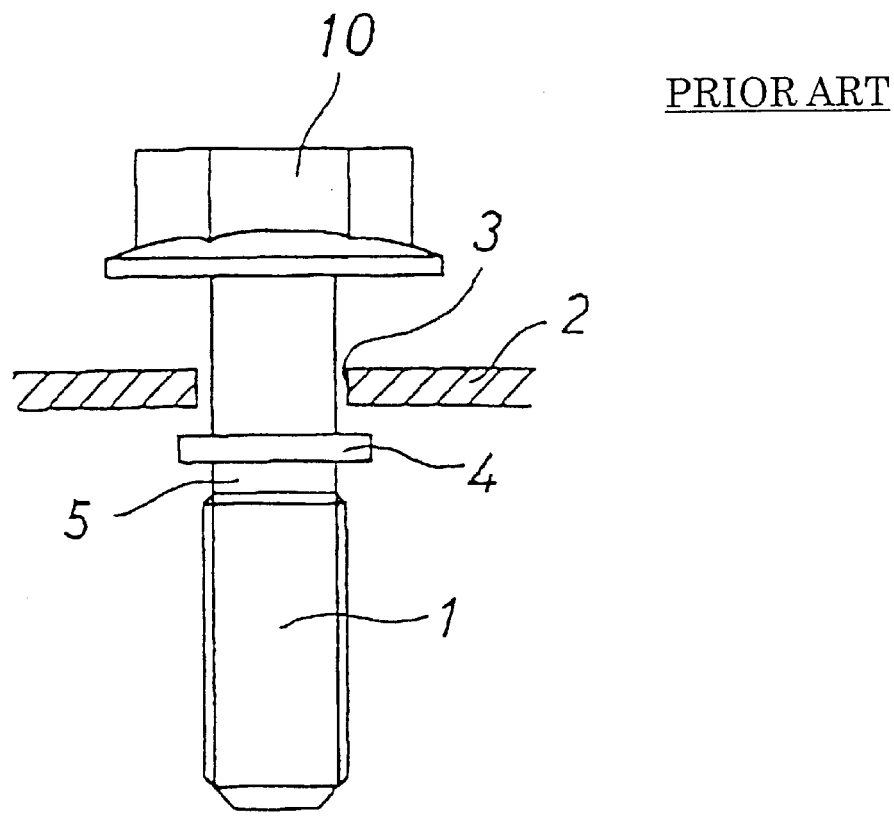
FIG. 8A is a front view showing a state, in which a prior washer temporarily holds a screw.
Figure 8B:
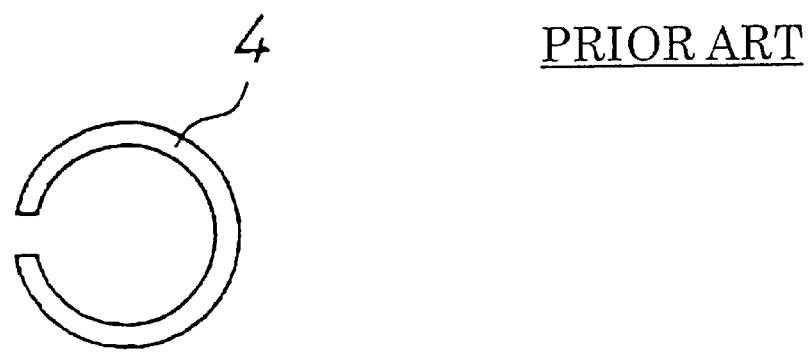
FIG. 8B is a plan view of the waqsher.
Figure 9:
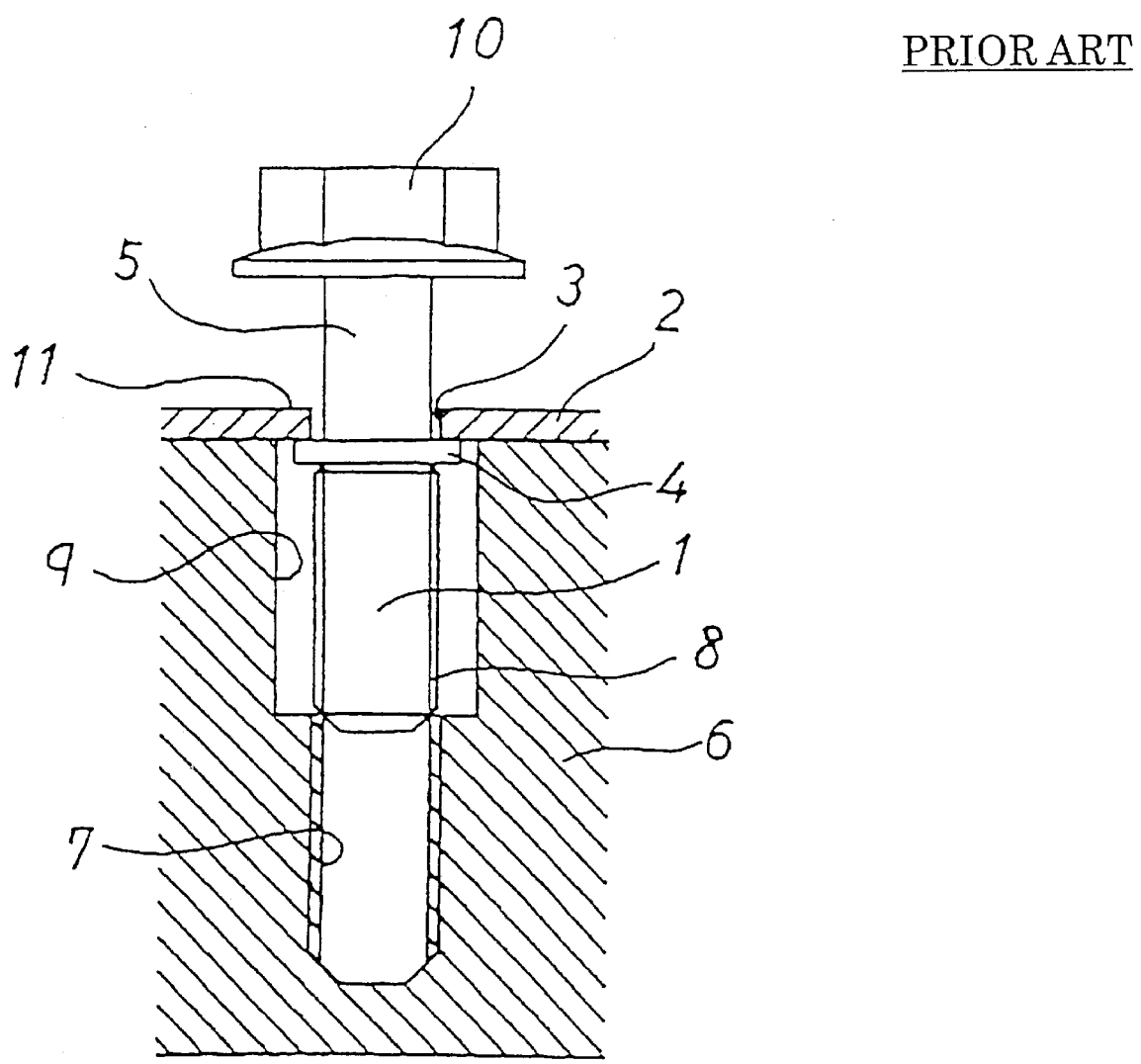
FIG. 9 is a front view showing a state, in which the screw of FIG. 8 is set on a mount member.
Figure 10A:
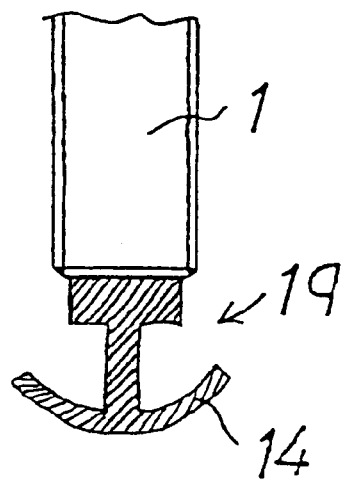
FIG. 10A is a partial view showing a prior example, in which a falling-off preventive member of a resin is fixed to a tip end of a screw.
Figure 10B:
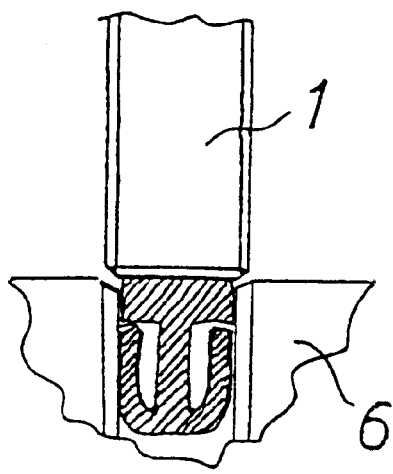
FIG. 10B is a partial view showing a state in which the length of the elastic blade portion and the falling-off preventing member become longer.

FIG. 6 shows a state, in which the screw inserted through the part being clamped 2 fastens together with a weld nut 17, which is fused to the mount member 6, to be clamped integrally. In FIG. 6, the temporary holding member 12 provided on an intermediate, outer periphery of the screw shank 1. The screw is inserted through the screw insertion hole 3 of the part being clamped 2 to be temporarily held thereon. The screw is being threaded into the weld nut 17 by rotating the screw head 10 after the screw abuts against an upper end of a female thread 18 of the weld nut 17. As threading proceeds, the temporary holding member 12 is pushed up by the weld nut 17 to be moved to below a neck immediately below the screw head 10. After the completion of clamping, the temporary holding member 12 collapses to fill into an air gap between the screw shank 1 and the part being clamped 2 and the mount member 6 and a part of plastics bites into interfaces between the male thread 8 and the female thread portion 7, so that the part being clamped 2 can be clamped with a higher clamping force than that in the prior art.

As described previously, with the screw of the invention, the temporary holding member having the elastic blade pieces is provided on the screw shank by means of insert molding, and so there is no need of fitting of the temporary holding member such as washer or the like by manual work. Also, falling-off of the screw from the part being clamped is eliminated to enable delivering an assembly, in which a screw is temporarily held on a part being clamped 2, to assembly shops, whereby manhour in assembly can be reduced and besides the number of parts can be reduced. Also, the temporary holding member is provided not below a neck of a prior screw but in a location at an intermediate portion of the screw shank and as downward as possible, whereby the length of the release hole can be significantly shortened and so a mount member such as a cover or the like can be made small in thickness and lightweight. Also, when a part being clamped is clamped to a mount member, the temporary holding member is caused to collapse and deform to fill into an air gap between the screw shank and the part being clamped and the mount member and a part of plastics bites into interfaces between the male thread and the female thread portion, so that sealing is made more complete, as compared with the prior art, to enable markedly suppressing generation of corrosion such as rust. Accordingly, the invention is exceedingly great in industrial value.

What is claimed is:

1. A screw comprising a shank, a head, and a temporary holding meter provided on the shank for temporarily holding the screw to a part, the part having a first side, a second side, a thickness and a hole, the hole being defined by walls comprising an interior portion of the part, the temporary holding member being deformable and provided on an intermediate, outer periphery of the shank and comprising radially extending elastic portions and a cylinder portion provided on the outer periphery of the shank having a thread portion which operatively engages a thread portion of the shank, wherein the temporary holding member is dimensioned and is deformable such that when the temporary holding member is provided on the screw, the radially extending portion being radially inwardly deformable enabling the screw to be insertable through the hole from the first side of the part and the temporary holding member temporarily holds the screw in relation to the part such that the screw can be threaded into a threaded bore located opposite said first side.

2. The screw according to claim 1, wherein the elastic portions are provided on an outer periphery of a lower end of the cylinder portion, which is provided on the temporary holding member.

3. The screw according to claim 1, wherein the elastic portions have an outer diameter of a largest portion thereof larger than an inner diameter of a screw insertion hole provided in the part being clamped, and elasticity allowing press fitting.

4. The screw according to claim 2, wherein the elastic portions have an outer diameter of a largest portion thereof larger than an inner diameter of a screw insertion hole provided in the part being clamped, and elasticity allowing press fitting.

* * * * *